US006531076B2

(12) United States Patent
Crano et al.

(10) Patent No.: US 6,531,076 B2
(45) Date of Patent: Mar. 11, 2003

(54) PHOTOCHROMIC ORGANIC RESIN COMPOSITION

(75) Inventors: John C. Crano, deceased, late of Murrysville, PA (US), by legal representative Nicholas J. Crano; Carol L. Knox, Monroeville, PA (US); Michael O. Okoroafor, Export, PA (US); Robert A. Smith, Murrysville, PA (US); Rifat Tabakovic, Troy, MI (US)

(73) Assignee: PPG Industries Ohio, Inc., Cleveland, OH (US)

( * ) Notice: Subject to any disclaimer, the term of this patent is extended or adjusted under 35 U.S.C. 154(b) by 44 days.

(21) Appl. No.: 09/766,554

(22) Filed: Jan. 19, 2001

(65) Prior Publication Data

US 2001/0050356 A1 Dec. 13, 2001

Related U.S. Application Data

(60) Provisional application No. 60/180,410, filed on Feb. 4, 2000.

(51) Int. Cl.[7] ............................. G02B 5/23; B32B 27/00
(52) U.S. Cl. ......................... 252/586; 528/61; 528/62; 528/64; 428/423.1; 428/423.3; 428/423.5; 428/424.2; 351/163
(58) Field of Search ......................... 252/586; 528/61, 528/62, 64; 428/423.1, 423.3, 423.5, 424.2; 351/163

(56) References Cited

U.S. PATENT DOCUMENTS

| 3,866,242 A | 2/1975 | Slagel ............................. 2/2.5 |
| 4,856,857 A | 8/1989 | Takeuchi et al. ............. 350/3.6 |
| 4,889,413 A | 12/1989 | Ormsby et al. ............. 350/354 |
| 5,310,577 A | 5/1994 | Mase et al. .................. 427/164 |
| 5,323,191 A | 6/1994 | Firtion et al. ................ 351/159 |
| 5,391,327 A | 2/1995 | Ligas et al. .................. 252/586 |
| 5,462,806 A | 10/1995 | Konishi et al. ............. 428/451 |
| 5,496,641 A | 3/1996 | Mase et al. ............... 428/423.1 |
| 5,552,091 A | 9/1996 | Kumar ........................ 252/586 |
| 5,645,767 A | 7/1997 | Van Gemert ................ 252/586 |
| 5,646,230 A | 7/1997 | Pantone et al. ............... 528/64 |
| 5,698,141 A | 12/1997 | Kumar ........................ 252/586 |
| 5,753,146 A | 5/1998 | Van Gemert et al. ....... 252/586 |
| 5,770,115 A | 6/1998 | Misura ........................ 252/586 |
| 5,811,503 A | 9/1998 | Herold et al. ............. 526/323.2 |
| 5,811,506 A | 9/1998 | Slagel ........................... 528/64 |
| 5,830,578 A | 11/1998 | Ono et al. ................... 428/446 |
| 5,962,617 A | 10/1999 | Slagel ........................... 528/61 |
| 5,962,619 A | 10/1999 | Seneker et al. ............... 528/64 |
| 6,025,026 A | 2/2000 | Smith et al. ................ 427/316 |
| 6,042,737 A | 3/2000 | Basil et al. .................... 216/37 |
| 6,060,001 A | 5/2000 | Welch et al. ................ 252/586 |
| 6,150,430 A | 11/2000 | Walters et al. ................ 522/79 |
| 6,153,126 A | 11/2000 | Kumar ........................ 252/586 |
| 6,166,129 A | 12/2000 | Rosthauser et al. ......... 524/590 |
| 6,187,444 B1 | 2/2001 | Bowles, III et al. ..... 428/423.1 |

FOREIGN PATENT DOCUMENTS

| DE | 116520 | 11/1975 |
| DE | 3201224 A1 | 7/1983 |
| EP | 0 146 136 A3 | 6/1985 |
| EP | 0 294 056 B1 | 12/1988 |
| EP | 0 454 066 A2 | 10/1991 |
| EP | 0 927 730 A1 | 7/1999 |
| JP | 62-226134 | 10/1987 |
| JP | 3-269507 | 12/1991 |
| JP | 5-28753 | 4/1993 |
| WO | WO 96/11926 | 4/1996 |
| WO | WO 98/37115 | 8/1998 |

OTHER PUBLICATIONS

U.S. Patent Application Ser. No. 09/187,698, filed Nov. 6, 1998 entitled "Photochromic Epoxy Resin Coating Composition and Articles Having Such a Coating".
U.S. Patent Application Ser. No. 09/209,731, filed Dec. 11, 1998 entitled "Polyanhydride Photochromic Coating Composition and Photochromic Articles".
U. S. Patent Application Ser. No. 60/112,794, filed Dec. 18, 1998 entitled "Aminoplast Resin Photochromic Coating Composition an Photochromic Aricles".
U.S. Patent Application Ser. No. 09/449,099, filed Nov. 24, 1999 entitled "Aminoplast Resin Photochromic Coating Composition and Photochromic Articles".
U.S. Patent Application Ser. No. 09/449,100, filed Nov. 24, 1999 entitled "Aminoplast Resin Photochromic Coating Composition and Photochromic Articles".
U.S. Patent Application Ser. No. 09/345,028, filed Jul. 2, 1999 entitled "Poly(Meth)Acrylic Photochromic Coating".
U.S. Patent Application Ser. No. 60/067,868, filed Dec. 08, 1997 entitled "Photochromic Epoxy Resin Coating Composition and Articles Having Such a Coating".
J.C. Crano, "Chromogenic Materials", *Kirk–Othmer Encyclopedia of Chemical Technology*, 4th Ed., vol. No. 6, pp. 321–332., No Date.
C.D. Eisenbach, "New Aspects of Photochromism in Bulk Polymers", Society of Photographic Scientists and Engineers, 1979.
U.S. Patent Ser. No. 09/499,054, filed Feb. 4, 2000 entitled "Photochromic Coated Articles".
U.S. Patent Application Ser. No. 09/724,145, filed Nov. 28, 2000 entitled "Organic Photochromic Compositions of improved Kinetic Performance".

Primary Examiner—Philip Tucker
(74) Attorney, Agent, or Firm—Frank P. Mallak

(57) ABSTRACT

Described are photochromic organic resin compositions and the impact resistant polymerizates and coating compositions made therefrom. The organic resin composition comprises the reaction product of at least one polyol having greater than 1.0 hydroxyl groups; at least one polyisocyanate having greater than 1.0 isocyanato groups; and at least one polyamine curing agent having greater than 1.0 amino groups. The polymerizates are made photochromic either by the addition of organic photochromic compounds to the reactants used to form the polymerizate or by methods that imbibe or transfer the photochromic compounds into the polymerizate. Optically clear photochromic and impact resistant articles such as ophthalmic lenses and articles having photochromic coatings prepared from the photochromic organic resin compositions are also described.

29 Claims, No Drawings

PHOTOCHROMIC ORGANIC RESIN COMPOSITION

CROSS REFERENCE TO RELATED APPLICATIONS

This application claims priority to provisional application Ser. No. 60/180,410, filed Feb. 4, 2000.

DESCRIPTION OF THE INVENTION

The present invention relates to photochromic organic resin compositions and the impact resistant polymerizates and coating compositions made therefrom. More particularly, this invention relates to poly(urea-urethane) compositions comprising the reaction product of at least one polyol, e.g., diol, at least one polyisocyanate and at least one polyamine curing agent, which compositions contain a photochromic amount of organic photochromic compound(s). The present invention also relates to photochromic polymerizates and articles having photochromic coatings prepared from such organic resin compositions.

Photochromic compounds exhibit a reversible change in color when exposed to light radiation involving ultraviolet rays, such as the ultraviolet radiation in sunlight or the light of a mercury lamp. Various classes of photochromic compounds have been synthesized and suggested for use in applications in which a sunlight-induced reversible color change or darkening is desired. The most widely described classes of photochromic compounds are oxazines, pyrans and fulgides.

The general mechanism responsible for the reversible change in color, i.e., a change in the absorption spectrum in the visible range of light (400–700 nm), exhibited by different types of photochromic compounds has been described and categorized. See John C. Crano, "Chromogenic Materials (Photochromic)", *Kirk-Othmer Encyclopedia of Chemical Technology*, Fourth Edition, 1993, pp. 321–332. The general mechanism for the most common classes of photochromic compounds, e.g., indolino spiropyrans and indolino spirooxazines, involves an electrocyclic mechanism. When exposed to activating radiation, these compounds transform from a colorless closed ring compound into a colored open ring species. In contrast, the colored form of fulgide photochromic compounds is produced by an electrocyclic mechanism involving the transformation of a colorless open ring form into a colored closed ring form.

In the aforedescribed electrocyclic mechanisms, the photochromic compounds require an environment in which they can reversibly transform. In solid polymer matrices, the rates at which the photochromic processes of activation, i.e., formation of color or darkening, and fading, i.e., the return to the original or colorless state, occur are believed to be dependent on the free volume in the polymer matrix. The free volume of the polymer matrix is dependent upon the flexibility of the chain segments of the polymer environment surrounding the photochromic compound, i.e., the local mobility or local viscosity of the chain segments comprising the matrix. See Claus D. Eisenbach, "New Aspects of Photochromism in Bulk Polymers", Photographic Science and Engineering, 1979, pp. 183–190. One of the main obstacles reported by Claus D. Eisenbach, for the larger commercial application of photochromic systems, is the slow rate of photochromic activation and fade in a solid polymer matrix.

The use of photochromic compounds in polyurethanes has been disclosed in WO 98/37115; German Democratic Republic Patent No. 116 520; European Patent Applications 0 146 136 and 0 927 730; U.S. Pat. No. 4,889,413; and Japanese Patent Applications 3-269507 and 5-28753. Although the use of photochromic compounds in polyurethanes has been described in the literature, the use of photochromic compounds in poly(urea-urethane) resins and coatings and in impact resistant articles and coated articles made from such resins and coatings has not been disclosed.

It has now been discovered that an impact resistant photochromic-article can be produced from a composition comprising the reaction product of (a) at least one polyol having greater than 1.0 hydroxyl groups per molecule, e.g., diol; (b) at least one polyisocyanate having greater than 1.0 isocyanato groups per molecule; (c) at least one polyamine having greater than 1.0 amino groups per molecule, and optionally (d) at least one polyol having greater than 2.0 hydroxyl groups per molecule. In a preferred embodiment, the number of isocyanato groups of the polyisocyanate reactants is greater than the number of hydroxyl groups of the polyol reactants. Organic photochromic compounds can be added to the resin composition prior to forming a coating or polymerizate, e.g., a lens, or the photochromic compounds can be imbibed or transferred into the coating or polymerizate.

DETAILED DESCRIPTION OF THE INVENTION

In recent years, photochromic articles, particularly photochromic plastic materials for optical applications, have been the subject of considerable attention. In particular, photochromic ophthalmic plastic lenses have been investigated because of the weight advantage they offer, vis-a-vis, glass lenses. Moreover, photochromic transparencies for vehicles, such as cars, boats and airplanes, have been of interest because of the potential safety features, that such transparencies offer.

Polymers that are typically used to prepare impact resistant articles include polymers based on bisphenol-A-polycarbonates and acrylic polymers. Thermoplastic polycarbonates are considered superior to acrylics in impact resistance but have limited wearability since resistance to abrasion and chemicals is poor. The performance of photochromic compounds in such polycarbonates is also poor because the polycarbonate does not have sufficient internal free volume for photochromic compounds to function properly, i.e., to achieve an acceptable activated intensity and acceptable rates of activation and fade.

Other than in the operating examples, or where otherwise indicated, all numbers expressing wavelengths, quantities of ingredients or reaction conditions used herein are to be understood as modified in all instances by the term "about". The number of hydroxyl, isocyanato and/or amino groups per molecule reported herein is an average value and can be a partial number, e.g., 1.8.

The disclosures of the patents and articles cited herein related to poly(urea-urethane), diols and their reaction with ε-caprolactone, polyols, catalysts, photochromic compounds, imbibition compositions and stabilizers are incorporated herein, in toto, by reference.

It has now been discovered that impact resistant photochromic polymers having acceptable photochromic properties can be prepared. In accordance with the present invention impact-resistant non-elastomeric photochromic poly (urea-urethane) polymerizates are prepared. By the term "non-elastomeric" is meant that an article of the present invention could not be stretched to twice its length and upon release resume its original length. The term polymerizate is defined herein to include polymeric coatings and films and articles such as lenses prepared from the organic resin composition of the present invention.

The polymerizates of the present invention are made photochromic either by the addition of organic photochromic compounds to the reactants used to form the polymerizate or by methods that imbibe or transfer the photochromic compounds into the polymerizate. In particular, the poly (urea-urethane) comprises the reaction product of reactants comprising (a) at least one polyol having greater than 1.0 hydroxyl groups per molecule, e.g., 1.1 hydroxyl groups; (b) at least one polyisocyanate having greater than 1.0 isocyanato groups per molecule; (c) at least one polyamine having greater than 1.0 amino groups per molecule, each amino group being independently selected from primary amino and secondary amino; and optionally, (d) at least one polyol having greater than 2.0 hydroxyl groups per molecule; provided that the number of isocyanato groups of the isocyanate reactants is greater than the number of hydroxyl groups of the polyol reactants.

One polyol, e.g., diol, or more than one diol may be employed in forming the poly(urea-urethane). The polyols which can be used are numerous and widely varied. They are preferably substantially free from ethylenic or acetylenic unsaturation. The polyols which are used are most often aliphatic, alicyclic, aromatic, aliphatic-alicyclic, aliphatic-aromatic, alicyclic-aromatic, or aliphatic-alicyclic-aromatic in nature. The polyols are usually simple diols, e.g., diols having a molecular weight of less than 500 grams per mole, ester diols, polyester diols, ether diols, polyether diols, or mixtures of such polyols. Although, other kinds of diols can be employed as desired. The aliphatic groups of the diols can be straight or branched. Examples of such polyols are disclosed in U.S. Pat. No. 5,684,083.

The aforedescribed polyols have greater than 1.0 hydroxyl groups per molecule, preferably greater than 1.5 hydroxyl groups per molecule, and more preferably, at least 2.0 hydroxyl groups per molecule.

The diols which are employed, usually have a weight average molecular weight ranging from at least 62, preferably from 100, more preferably from 200, and most preferably from at least 300. The weight average molecular weight of the diol is usually not more than 20,000, preferably not more than 10,000, more preferably, not more than 8,000, and most preferably, not more than 2,000. For example, the weight average molecular weight of the diol may range from 400 to 1,500. The weight average molecular weight of the diol may range between any combination of these values, inclusive of the recited values.

Examples of suitable diols include:
1,2-ethanediol, 1,2-propanediol, 1,3-propanediol,
1,3-butanediol, 1,4-butanediol, 1,5-pentanediol,
2,2-dimethylpropane-1,3-diol, 2-butyl-2-ethylpropane-1,3-diol,
1,5-hexanediol, 1,6-hexanediol, 1,8-octanediol,
1,10-decanediol, 1,12-dodecanediol,
2,2,4,4-tetramethylcyclobutane-1,3-diol, 1,3-cyclopentanediol,
1,2-cyclohexanediol, 1,3-cyclohexanediol, 1,4-cyclohexanediol,
1,2-cyclohexanedimethanol, 1,3-cyclohexanedimethanol,
1,4-cyclohexanedimethanol, and 1,4-cyclohexanediethanol.

Other examples include the polyalkylene glycols such as: diethylene glycol, triethylene glycol, tetraethylene glycol, higher poly(ethylene glycol), such as those having number average molecular weights of from 220 to 2000, dipropylene glycol, tripropylene glycol, and higher poly(propylene glycol) such as those having number average molecular weights of from 234 to 2000.

Yet other examples of suitable diols include
4,4'-(1-methylethylidene)bis[cyclohexanol],
2,2'-methylenebis[phenol], 4,4'-methylenebis[phenol],
4,4'-(phenylmethylene)bis[phenol],
4,4'-(diphenylmethylene)bis[phenol],
4,4'-(1,2-ethanediyl)bis[phenol],
4,4'-(1,2-cyclohexanediyl)bis[phenol],
4,4'-(1,3-cyclohexanediyl)bis[phenol],
4,4'-(1,4-cyclohexanediyl)bis[phenol],
4,4'-ethylidenebis[phenol],
4,4'-(1-phenylethylidene)bis[phenol],
4,4'-propylidenebis[phenol], 4,4'-cyclohexylidenebis[phenol],
4,4'-(1-methylethylidene)bis[phenol],
4,4'-(1-methylpropylidene)bis[phenol],
4,4'-(1-ethylpropylidene)bis[phenol],
4,4'-cyclohexylidenebis[phenol],
4,4'-(2,4,8,10-tetraoxaspiro[5.5]undecane-3,9-diyldi-2,1-ethanediyl)bis[phenol], 1,2-benzenedimethanol,
1,3-benzenedimethanol, 1,4-benzenedimethanol,
4,4'-[1,3-phenylenebis(1-methylethylidene)]bis[phenol],
4,4'-[1,4-phenylenebis(1-methylethylidene)]bis[phenol],
phenolphthalein, 4,4'-(1-methylidene)bis[2-methylphenol],
4,4'-(1-methylethylidene)bis[2-(1-methylethyl)phenol],
2,2'-methylenebis[4-methyl-6-(1-methylethyl)phenol], Ester diols, perhaps best exemplified by 3-hydroxy-2,2-dimethylpropyl 3-hydroxy-2,2-dimethylpropanoate, can be employed.

Polyester diols constitute yet another class of diols which can be used. The polyester diols which are employed usually have a weight average molecular weight in the range of from 200 to 1200. Often the polyester diols have a weight average molecular weight in the range of from 300 to 1000.

One type of polyester diol that can be used is that prepared by the reaction of a diol and a dicarboxylic acid. While any of the diols described above can be used, the simpler diols such as 1,6-hexanediol or.1,10-decanediol are preferred. Exemplary dicarboxylic acids include:
malonic acid, succinic acid, glutaric acid, adipic acid,
pimelic acid, suberic acid, azelaic acid, sebacic acid,
phthalic acid, isophthalic acid, and terephthalic acid.
Anhydrides, where they exist can be used in lieu of the corresponding dicarboxylic acids.

Another type of polyester diol that can be used is poly (caprolactone diol), which is the reaction product of one or more diols and ε-caprolactone. While any of the diols described above can be used in that reaction, the simpler diols such as 1,2-ethanediol, 1,4-butanediol, 2,2-dimethylpropane-1,3-diol, 1,6-hexanediol, 1,10-decanediol, 1,12-dodecanediol and diethylene glycol are most often used. U.S. Pat. No. 3,169,945, describes many suitable diols and their reaction with ε-caprolactone.

Polyether diols are commonly made by polymerizing one or more cyclic ethers such as epoxides (e.g., ethylene oxide, propylene oxide), oxetanes, oxolanes (e.g., tetrahydrofuran), or the like, in the presence of water or a diol starter. The polyether diols are made using any suitable catalyst, including, for example, potassium hydroxide, boron trifluoride, or a double metal cyanide. Double metal cyanide catalysts are preferred because they easily give polyether diols with exceptionally low unsaturation or monol content. The diols can be homopolymers (e.g., poly(oxypropylene) diols), random copolymers of two or more cyclic ethers (e.g., a random copolymer of propylene oxide and ethylene oxide), block copolymers (e.g., a poly(oxypropylene) core with poly(oxyethylene) caps, "tipped" copolymers (e.g., a poly(oxypropylene-co-oxyethylene core having one oxypropylene to oxyethylene ratio, which core is tipped with poly(oxypropylene-co-oxyethylene) having a different oxypropylene to oxyethylene ratio.

Usually, but not necessarily, the polyether diol has a weight average molecular weight in the range of from 1500 to 20,000. Often the weight average molecular weight is in the range of from 2000 to 10,000. Preferably the weight average molecular weight is in the range of from 2000 to 8000.

The actual hydroxyl functionality of polyether diols usually varies and often depends on the nature of the catalyst used to make the polyether diol. While a polyether diol made by conventional KOH catalysis typically has an actual hydroxyl functionality of only about 1.6 or 1.7, one made using double metal cyanide catalyst may have an actual hydroxyl functionality very close to 2.

In one contemplated embodiment, the polyether diols for use in the present invention have low unsaturations. In particular, the polyether diols have unsaturations less than 0.02 meq/g. Frequently the unsaturation is less than 0.01 meq/g and sometimes the unsaturation is less than 0.007 meq/g.

These polyether diols can be made by various known methods, including use of double metal cyanide catalysts, as described in U.S. Pat. Nos. 5,158,922; 5,470,813; and 5,482,908.

One polyisocyanate having greater than 1.0 isocyanato groups per molecule, e.g., 1.5 groups per molecule, or a mixture of more than one such polyisocyanate may be used in forming the poly(urea-urethane). In most instances, the polyisocyanate has at least two isocyanato groups. When a mixture of polyisocyanates is employed and when some have more than two isocyanato groups, the mixture usually (but not necessarily) contains one or more polyisocyanates having two isocyanato groups. In most instances the average isocyanato functionality is in the range of from 2 to 4 isocyanato groups per molecule. Frequently the average isocyanato functionality is in the range of from 2 to 3 isocyanato groups per molecule. In many instances the average isocyanato functionality is in the range of from 2 to 2.5 isocyanato groups per molecule. Preferably the average isocyanato functionality is 2 isocyanato groups per molecule.

The polyisocyanates which can be used are numerous and widely varied. Examples of types and classes of polyisocyanates include aliphatic polyisocyanates, alicyclic polyisocyanates where one or more isocyanato groups are attached directly to the ring, alicyclic polyisocyanates where one or more isocyanato groups are not attached directly to the ring, aromatic polyisocyanates where one or more isocyanato groups are attached directly to the ring, aromatic polyisocyanates where one or more isocyanato groups are not attached directly to the ring, hybrids of any of the foregoing and mixtures of such polyisocyanates.

Representative examples of suitable polyisocyanates include, but are not limited to:
1,2-diisocyanatoethane, 1,2-diisocyanatopropane,
1,3-diisocyanatopropane, 1,2-diisocyanato-2-methylpropane,
1,2-diisocyanatobutane, 1,3-diisocyanatobutane,
1,4-diisocyanatobutane, 1,5-diisocyanatopentane,
1,6-diisocyanatohexane, 1,7-diisocyanatoheptane,
1,8-diisocyanatooctane, 1,9-diisocyanatononane,
1,10-diisocyanatodecane, 1,5-diisocyanato-2,2-dimethylpentane,
ethylidine diisocyanate, butylidene diisocyanate,
bis(2-isocyanatoethyl)ether, 1,2-diisocyanatocyclopentane,
1,3-diisocyanatocyclopentane, 1,2-diisocyanatocyclohexane,
1,3-diisocyanatocyclohexane, 1,4-diisocyanatocyclohexane,
bis(4-isocyanatocyclohexyl)ether,
1-(isocyanatomethyl)-5-isocyanato-1,3,3-trimethylcyclohexane,
1-(isocyanatomethyl)-1-(3-isocyanatopropyl)cyclohexane,
bis(2-isocyanatocyclohexyl)methane,
bis(3-isocyanatocyclohexyl)methane,
bis(4-isocyanatocyclohexyl)methane,
1,2-bis(2-isocyanatocyclohexyl)ethane,
1,2-bis(3-isocyanatocyclohexyl)ethane,
1,2-bis(4-isocyanatocyclohexyl)ethane,
2,2-bis(4-isocyanatocyclohexyl)propane,
2,3-bis(8-isocyanatooctyl)-4-octyl-5-hexylcyclohexene,
1,2-diisocyanatobenzene, 1,3-diisocyanatobenzene,
1,4-diisocyanatobenzene, 1,4-diisocyanato-2-ethylbenzene,
1,3-diisocyanato-5-(1-methylethyl)benzene,
1,2-dimethyl-3,5-diisocyanatobenzene,
1,3-bis(1-isocyanato-1-methylethyl)benzene,
1,4-bis(1-isocyanato-1-methylethyl)benzene,
bis(2-isocyanatophenyl)methane,
bis(3-isocyanatophenyl)methane,
bis(4-isocyanatophenyl)methane,
1,2-bis(2-isocyanatophenyl)ethane,
1,2-bis(3-isocyanatophenyl)ethane,
1,2-bis(4-isocyanatophenyl)ethane,
4,4-diisocyanatobiphenyl, 1,4-diisocyanatonaphthalene,
1,5-diisocyanatonaphthalene,
1,5-bis(isocyanatomethyl)naphthalene,
2,4-diisocyanatotoluene, 2,6-diisocyanatotoluene,
1,2-bis(isocyanatomethyl)benzene,
1,3-bis(isocyanatomethyl)benz ene,
1,4-bis(isocyanatomethyl)benzene,
1,2-bis(2-isocyanatoethyl)benzene,
1,3-bis(2-isocyanatoethyl)benzene,
1,4-bis(2-isocyanatoethyl)benzene,
1,2-bis(4-isocyanato-1-methylethyl)benzene,
1,3-bis(1-isocyanato-1-methylethyl)benzene,
1,4-bis(1-isocyanato-1-methylethyl)benzene,
1,2-bis(4-isocyanatobutyl)benzene,
1,3-bis(4-isocyanatobutyl)benzene,
1,4-bis(4-isocyanatobutyl)benzene,
bis(4-isocyanatophenyl)ether, bis(4-isocyanatomethylphenyl)
ether, 3,3'-diisocyanatobiphenyl, 4,4'-diisocyanatobiphenyl,
4,4'-diisocyanato-2,2'-dimethylbiphenyl,
4,4'-diisocyanato-3,3'-dimethylbiphenyl,
4,4'-diisocyanato-2,2'-dimethoxybiphenyl,
4,4'-diisocyanato-3,3'-dimethoxybiphenyl,
2,5-bis(isocyanatomethyl)furan,
tris(4-isocyanatophenyl)methane,
tris(4-isocyanatocyclohexyl)methane,
1,3,5-triisocyanatobenzene, 2,4,6-triisocyanatotoluene,
2,4,6-triisocyanatomesitylene,
1,3,5-tris(6-isocyanatohexyl)biuret,
2,4,6-triisocyanato-1,3,5-triazine,
2-isocyanatomethyl-2-(3-isocyanatopropyl)-5-isocyanatomethyl-bicyclo[2.2.1]heptane,
2-isocyanatomethyl-3-(3-isocyanatopropyl)-5-isocyanatomethyl-bicyclo[2.2.1]heptane,
2-isocyanatomethyl-2-(3-isocyanatopropyl)-6-isocyanatomethyl-bicyclo[2.2.1]heptane, 2-isocyanatomethyl-3-(3-isocyanatopropyl)-6-isocyanatomethyl-bicyclo[2.2.1]heptane,
2-isocyanatomethyl-2-(3-isocyanatopropyl)-5-(2-isocyanatoethyl)bicyclo[2.2.1]heptane,
2-isocyanatomethyl-3-(3-isocyanatopropyl)-6-(2-isocyanatoethyl)bicyclo[2.2.1]heptane,
2-isocyanatomethyl-2-(3-isocyanatopropyl)-6-(2-isocyanatoethyl)bicyclo[2.2.1]heptane,
bis(2,5-diisocyanato-4-methylcyclohexyl)methane,
bis(2,5-diisocyanato-4-methylphenyl)methane,
polymeric polyisocyanates such as dimers and trimers, and prepolymers which are derived from a polyol, including a hydrocarbon polyol, a polyether polyol, a polyester polyol or mixtures of such polyols. An example is an adduct (approximately 3:1, molar) of 1-isocyanatomethyl-5-isocyanato-1,3,3-trimethylcyclohexane and 2-ethyl-2-(hydroxymethyl)-1,3-propanediol.

In one contemplated embodiment, the polyisocyanate is bis(4-isocyanatocyclohexyl)methane. The trans-trans isomer, the cis-trans isomer or the cis-cis isomer may be used either alone or in combination with either or both of the other isomers; however, the trans-trans isomer is preferred. In most instances the trans-trans isomer constitutes from 20 to 100 percent of the bis(4-isocyanatocyclohexyl)methane. It is especially preferred that the bis(4-isocyanatocyclohexyl)-methane contain at least about 50 percent of the trans-trans isomer and no more than 20 percent of the cis-cis isomer.

The polyamine has greater than 1.0 amino groups per molecule, each amino group being independently selected from primary amino (—NH$_2$) or secondary amino (—NH—). In one contemplated embodiment, all of the amino groups are primary amino. The polyamine reactant may be selected from aliphatic polyamines, cycloaliphatic polyamines, aromatic polyamines and polyamines of mixed aliphatic, cycloaliphatic, and/or aromatic types, or mixtures thereof. Preferably the polyamine reactant has at least two primary amino groups.

The polyamines which can be used are numerous and widely varied. Examples of suitable diamines include, but are not limited to: 1,2-ethanediamine, 1,3-propanediamine, 1,4-butanediamine, 1,5-pentanediamine, 1,6-hexanediamine, 1,7-heptanediamine, 1,8-octanediamine, 1,9-nonanediamine, 1,10-decanediamine, 1,2-benzenediamine, 1,3-benzenediamine, 1,4-benzenediamine, 1,5-naphthalenediamine, 1,8-naphthalenediamine, 2,4-toluenediamine, 2,5-toluenediamine, 3,3'-dimethyl-4,4'-biphenyldiamine, 4,4'-methylenebis[aniline], 4,4'-methylenebis[2-chloroaniline], 4,4'-oxybis[aniline], [1,1'-biphenyl]-4,4'-diamine, [1,1'-biphenyl]-3,3'-dichloro-4,4'-diamine, 6-phenyl-1,3,5-triazine-2,4-diamine, and piperazine.

The polyamine reactant may also be selected from one or more isomers of C$_1$–C$_3$ dialkyl toluenediamine, such as for example: 3,5-dimethyl-2,4-toluenediamine, 3,5-dimethyl-2,6-toluenediamine, 3,5-diethyl-2,4-toluenediamine, 3,5-diethyl-2,6-toluenediamine, 3,5-diisopropyl-2,4-toluenediamine, 3,5-diisopropyl-2,6-toluenediamine. A preferred embodiment is an isomeric mixture containing mostly 3,5-diethyl-2,4-toluenediamine and 3,5-diethyl-2,6-toluenediamine.

In one embodiment of the present invention, the polyamine reactant can be selected from one or more diamines represented by Formula (I):

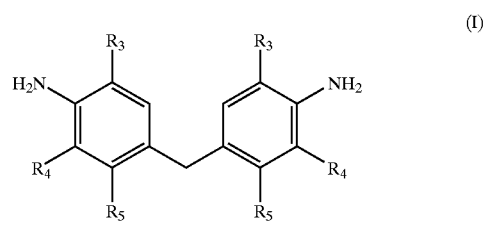

wherein $R_3$ and $R_4$ are each independently $C_1$–$C_3$ alkyl, and $R_5$ is selected from hydrogen and halogen, e.g., chlorine and bromine. The diamine represented by Formula (I) can be described generally as a 4,4'-methylene-bis(dialkylaniline). Specific examples of diamines represented by Formula (I) include, but are not limited to:
4,4'-methylenebis[2,6-dimethylaniline],
4,4'-methylenebis[2,6-diethylaniline],
4,4'-methylenebis[2-ethyl-6-methylaniline],
4,4'-methylenebis[2,6-diisopropylaniline],
4,4'-methylenebis[2-isopropyl-6-methylaniline], and
4,4'-methylenebis[2,6-diethyl-3-chloroaniline]. A preferred diamine represented by Formula (I) is 4,4'-methylenebis[2,6-diethyl-3-chloroaniline].

The polyamine may contain more than two amino groups. Examples include: diethylenetriamine, triethylenetetramine, tetraethylenepentamine, pentaethylenehexamine, 2-amino-1-ethylpiperazine, and N,N'-bis(3-aminopropylene)piperazine.

One or more polyols having greater than 2.0 hydroxyl groups per molecule may optionally be used in forming the poly(urea-urethane). Such polyols include the triols, tetrols, or higher functional polyols. These polyols are numerous and widely varied. Examples include, but are not limited to: glycerol, 1,1,1-trimethylolethane, 1,1,1-trimethylolpropane, 1,2,3-benzenetriol, 1,2,4-benzenetriol, 1,3,5-benzenetriol, 1,3,5-cyclohexanetriol, erythritol, pentaerythritol, 4,4'-(1,2-diethyl-1,2-dihydroxyethanediyl)bis[phenol], sorbitol, mannitol, α-methylglucoside, sorbitani dipentaerythritol, tripentaerythritol and mixtures thereof.

Generally, but not necessarily, the polyol having greater than 2.0 hydroxyl groups has an average hydroxyl functionality of three hydroxyl groups per molecule. When a polyol having at least three hydroxyl groups is employed, it is used in minor amount. For convenience and economy of space, the diol and the polyol having greater than 2.0 hydroxyl groups will be collectively referred to herein as "total polyol". In most instances the ratio of the hydroxyl equivalents of polyol having greater than 2.0 hydroxyl groups to the hydroxyl equivalents of diol having greater than 1.0 hydroxyl groups present in the total polyol is in the range of from 0 to 0.25:1. Often the ratio is in the range of from 0 to 0.2:1. In one contemplated embodiment, the ratio is in the range of from 0.01:1 to 0.2:1. In another contemplated embodiment, the ratio is in the range of 0.05:1 to 0.1:1.

Usually the average isocyanato functionality of the polyisocyanate having greater than 1.0 isocyanato groups used in preparing the poly(urea-urethane) is in the range of from 2 to 3 isocyanato groups per molecule. In one contemplated embodiment, the polyisocyanate has an average isocyanato functionality of 2 isocyanato groups per molecule.

In most instances the average amino functionality of the polyamine having greater than 1.0 amino groups per molecule used in preparing the poly(urea-urethane) is in the range of from 2 to 4 amino groups per molecule. In one contemplated embodiment, the polyamine has an average amino functionality of 2 amino groups per molecule.

It is also preferred to use an aromatic polyamine that has relatively low yellowness. A low-yellowness polyamine will tend to give low yellowness poly(urea-urethanes). Low-yellowness polyamines (especially low-yellowness diamines) are available commercially. Alternatively, the yellowness of aromatic polyamines with higher yellowness can be reduced by conventional means (e.g., distillation, carbon treatment, addition of reducing agents, and the like).

The polymerizates of this invention can be prepared by the one shot, quasi-prepolymer, or full prepolymer methods, all of which are well known in the art. Of these, the full prepolymer method is preferred.

In the preferred process for making the poly(urea-urethanes), a prepolymer is first made by reacting the polyisocyanate and the total polyol at an NCO/OH equivalent ratio in the range of from 1.3:1 to 4.5:1. Preferably the NCO/OH equivalent ratio is in the range of from 2.4:1 to 4:1. The reaction may conveniently be conducted at temperatures in the range of from 40° C. to 145° C. under a blanket of unreactive gas such as nitrogen or helium. Often the temperature is in the range of from 70° C. to 135° C. Frequently the temperature is in the range of from 90° C. to 130° C. Either or both of the reactants may be fed to the reaction mixture during the reaction, but it is more usual to simply admix the reactants and then heat the mixture to reaction temperature under a blanket of unreactive gas and maintain the reaction mixture at the reaction temperature for a period in the range of from 10 to 60 minutes. In general, higher reaction temperatures favor shorter reaction periods.

Although no catalyst is required during prepolymer formation, the use of a catalyst is often desirable. When a catalyst is used, it is preferably an organometallic catalyst, such as, for example, an organometallic tin, lead, iron, bismuth, or mercury compound. Organotin compounds such as dibutyltin dilaurate are preferred. Delayed-action catalysts can also be used. Other suitable catalysts are described in U.S. Pat. No. 5,646,230. When a catalyst is used, it is ordinarily used in an amount in the range of from 25 to 1000 parts per million of total reactants, by weight. In as much as the polyisocyanate is used in excess, the product is an isocyanate-terminated prepolymer.

Small additional amounts of polyisocyanate may optionally be added to the prepolymer when it is desired to increase the isocyanato content.

In one contemplated embodiment, the polyamine, photochromic compound(s) and the prepolymer are admixed to form a reaction mixture which is applied as a coating to a substrate or poured into a preheated mold and cured to form a photochromic poly(urea-urethane) article. In another contemplated embodiment, the mold is a lens mold and the poly(urea-urethane) article is a photochromic ophthalmic lens. In forming the reaction mixture, the polyamine and the prepolymer are admixed at an amine/NCO equivalent ratio in the range of from 0.85:1 to 1.2:1. Often the amine/NCO equivalent ratio is in the range of from 0.9:1 to 1.1:1. In many instances the amine/NCO equivalent ratio is in the range of from 0.9:1 to 1.05:1. Preferably the amine/NCO equivalent ratio is in the range of from 0.92:1 to 1:1.

Alternatively, the poly(urea-urethane) may be prepared by a quasi-prepolymer method of reacting the polyisocyanate with 0.3 to 0.8 equivalents of the total polyol to form a prepolymer, and then the remaining 0.2 to 0.7 equivalents of the total polyol are added with the diamine curing agent.

The curing reaction may conveniently be conducted at temperatures in the range of from 40° C. to 135° C. Often the temperature is in the range of from 45° C. to 110° C. Frequently the temperature is in the range of from 50° C. to 100° C. The curing period is usually in the range of from 3 minutes to 24 hours, depending upon the rate of reaction between the amino groups of the polyamine and the isocyanato groups of the prepolymer. Optionally, once the poly (urea-urethane) is solid enough to hold its shape, it may be removed from the mold and post-cured by heating it in an oven for several hours (usually overnight). Preferably, the potlife of the reaction mixture (that is, the maximum time the formulator has to fill the mold with the reaction mixture after admixing the polyamine, photochromic compounds and the prepolymer) is at least 20 seconds, and more preferably at least 30 seconds.

Various conventional additives may be incorporated into the reaction mixture which is polymerized in accordance with the invention. Such additives may include light stabilizers, heat stabilizers, antioxidants, ultraviolet light absorbers, mold release agents, static (non-photochromic) dyes, pigments, and flexibilizing additives, e.g., alkoxylated phenol benzoates and poly(alkylene glycol) dibenzoates. Antiyellowing additives, e.g., 3-methyl-2-butenol, organo pyrocarbonates and triphenyl phosphite, may also be added to enhance resistance to yellowing. Such additives are typically present in amounts totaling 10% or less by weight, preferably less than 5% by weight, and more preferably less than 3% by weight, based on the total weight of the combined polyamine and prepolymer. While such conventional additives may be added to either the prepolymer or the polyamine, they are preferably incorporated into the polyamine.

Specific stabilizers contemplated for use in combination with the organic photochromic compounds described hereinafter include those hindered amine light stabilizer (HALS) materials reported to function as radical scavengers and that contain a 2,2,6,6-tetramethylpiperidine ring or 2,2,6,6-tetramethylpiperazinone. Such stabilizers are typically used in an amount of from 0.01 to 10 weight percent, based on the total weight or the organic resin composition.

In one contemplated embodiment, the following HALS materials are used with the organic photochromic compounds incorporated into the organic resin composition individually or in combination: bis(1,2,2,6,6-pentamethyl-4-piperdinyl) [3,5-bis(1,1-dimethylethyl-4-hydroxyphenyl) methyl]butyl propanedioate; bis(1,2,2,6,6-pentamethyl-4-piperdinyl)sebacate and methyl(1,2,2,6,6-pentamethyl-4-piperidinyl sebacate; and N-unsubstituted HALS materials, e.g., SANDUVOR 3051, 3052 and 3055.

The preparation of poly(urea-urethane) is described in U.S. Pat. Nos. 3,866,242; 5,811,506; 5,962,617; and 5,962,619.

The organic photochromic compounds contemplated for use in the photochromic resin composition of the present invention are organic photochromic compounds having at least one activated absorption maxima within the range of between about 400 and 700 nanometers, or substances containing the same. The photochromic compounds may each be used alone or in combination with one or more other organic photochromic materials.

The organic photochromic materials may include naphthopyrans, benzopyrans, indenonaphthopyrans, phenanthorpyrans, spiro(benzindoline)naphthopyrans, spiro (indoline)benzopyrans, spiro(indoline)naphthopyrans, spiro (indoline)quinopyrans, spiro(indoline) pyrans, spiro (indoline)naphthoxazines, spiro(indoline) pyridobenzoxazines, spiro(benzindoline) pyridobenzoxazines, spiro(benzindoline)naphthoxazines, spiro(indoline)benzoxazines, mercury dithizonates, fulgides, fulgimides and mixtures of such photochromic compounds. Such photochromic compounds are described in U.S. Pat. Nos. 5,645,767 and 6,153,126.

The organic photochromic compounds may be incorporated into the poly(urea-urethane) resin composition by various methods described in the art. Such methods include adding the photochromic compounds to the prepolymer, to one or more of the materials used to form the prepolymer; and/or to the mixture of reactants in the one shot production process so that the photochromic compounds are cast in place when the composition is cured. Photochromic compounds may be imbibed into the polymerizates of the poly(urea-urethane) resin composition by immersion of the polymerizate in a hot solution of the photochromic compound(s) or by thermal transfer in which the photochromic compound(s) are provided as a separate layer, e.g., as a part of a polymeric film, which is thermally heated until the required amount of photochromic compound(s) is transferred. In such methods, the photochromic compounds may be dissolved and/or dispersed in an aqueous or organic solvent prior to being imbibed into the poly(urea-urethane) resin composition. The term "imbibition" or "imbibe" is intended to mean and include permeation of the photochromic compound(s) alone into the polymerizate, solvent assisted transfer of the photochromic compound(s) into a porous polymer, vapor phase transfer, and other such transfer mechanisms.

Each of the photochromic substances described herein may be used in amounts (or in a ratio) such that the poly(urea-urethane) resin composition and polymerizates made therefrom in which the photochromic compounds or mixture of compounds is incorporated, exhibits a desired resultant color, e.g., a fashionable color such as pink, or a substantially neutral color when activated with unfiltered sunlight, i.e., as near a neutral color as possible given the colors of the activated photochromic compounds. Neutral gray and neutral brown colors are preferred. Further discussion of neutral colors and ways to describe colors may be found in U.S. Pat. No. 5,645,767 column 12, line 66 to column 13, line 19.

The amount of the organic photochromic compounds to be incorporated into the poly(urea-urethane) resin composition is not critical provided that a sufficient amount is used to produce a photochromic effect discernible to the naked eye upon activation. Generally such amount can be described as a photochromic amount. The particular amount used depends often upon the intensity of color desired upon irradiation thereof and upon the method used to incorporate the photochromic compounds. Typically, the more photochromic compound incorporated, the greater is the color intensity up to a certain limit.

The relative amounts of the aforesaid photochromic compounds used will vary and depend in part upon the relative intensities of the color of the activated species of such compounds, the ultimate color desired and the method of incorporation into the host material or substrate. Generally, the amount of total photochromic compound incorporated into the poly(urea-urethane) resin composition may range from about 0.05 to about 2.0, e.g., from 0.2 to about 1.0, milligrams per square centimeter of surface to which the photochromic compound is incorporated or applied.

The photochromic poly(urea-urethane) article prepared in accordance with the present invention is a non-elastomeric, optically clear solid which exhibits low yellowness. Preferably, the optically clear solid is a photochromic material suitable for optical applications, such as plano, ophthalmic and contact lenses, windows, automotive transparencies, e.g., windshields, aircraft transparencies, plastic sheeting, polymeric films, etc. More preferably, the photochromic poly(urea-urethane) resin composition of the present invention is used to produce optically clear photochromic polymerizates, such as optical elements, e.g., plano and ophthalmic lenses.

Photochromic articles prepared from the poly(urea-urethane) resin composition of the present invention may be coated with a silica, titania, and/or zirconia-based hard coating material. Alternatively, an organic hard coating material of the ultraviolet curable type may be applied so as to form a hard surface layer, whereby the surface hardness is enhanced. Application of such protective coatings, e.g., abrasion resistant coatings, may be by any of the methods used in coating technology such as, for example, spray coating, spin coating, spread coating, curtain coating, dip coating or roll-coating. Other coatings and/or surface treatments, e.g., a tintable coating, antireflective surface, hydrophobic coating, etc., may also be applied individually or sequentially to at least one surface of the photochromic articles of the present invention. An antireflective coating, e.g., a monolayer or multilayer of metal oxides, metal fluorides, or other such materials, may be deposited onto the photochromic articles, e.g., lenses, of the present invention through vacuum evaporation, sputtering, or some other method.

It is believed that the presence of isocyanato and/or amino groups on the surface of the poly(urea-urethane) substrate will allow good adhesion of various coatings to the substrate. Therefore, most coatings may be applied directly to the substrate without an intermediate layer, coating or surface treatment to improve adhesion.

When the organic resin of the present invention is used as a coating composition, it may be applied to substrates, i.e., materials to which the coating composition is applied, of any type such as, for example paper, glass, ceramics, wood, masonry, textiles, metals and organic polymeric materials. In one contemplated embodiment, the substrate is an organic polymeric material, particularly, thermoset and thermoplastic organic polymeric materials, e.g., thermoplastic polycarbonate type polymers and copolymers, and homopolymers or copolymers of a polyol(allyl carbonate), used as organic optical materials.

The amount of the coating composition applied to the substrate is an amount necessary to incorporate a sufficient quantity of the organic photochromic compound(s) to produce a coating that exhibits a change in optical density ($\Delta OD$) when the cured coating is exposed to UV radiation. The cured coating may have a thickness of from 5 to 200 microns. Preferably, the coating thickness is from 5 to 100 microns, more preferably, 10 to 40 microns, e.g., 30 microns, and most preferably from greater than 10 to 25 microns, e.g., 20 microns. The thickness of the applied coating may range between any combination of these values, inclusive of the recited values.

If required and if appropriate, it is typical to clean the surface of the substrate to be coated prior to applying the coating composition of the present invention for the purposes of promoting adhesion of the coating. Effective treatment techniques for plastics, such as those prepared from diethylene glycol bis(allyl carbonate) monomer or thermoplastic polycarbonate, e.g., a resin derived from bisphenol A and phosgene, include ultrasonic cleaning; washing with an aqueous mixture of organic solvent, e.g., a 50:50 mixture of isopropanol: water or ethanol: water; UV treatment; activated gas treatment, e.g., treatment with low temperature plasma or corona discharge, and chemical treatment such as hydroxylation, i.e., etching of the surface with an aqueous solution of alkali, e.g., sodium hydroxide or potassium hydroxide, that may also contain a fluorosurfactant. See U.S. Pat. No. 3,971,872, column 3, lines 13 to 25; U.S. Pat. No. 4,904,525, column 6, lines 10 to 48; and U.S. Pat. No. 5,104,692, column 13, lines 10 to 59, which describe surface treatments of organic polymeric materials.

The treatment used for cleaning glass surfaces will depend on the type of dirt present on the glass surface. Such treatments are known to those skilled in the art. For example, washing the glass with an aqueous solution that may contain a low foaming, easily rinsed detergent, followed by rinsing and drying with a lint-free cloth; and ultrasonic bath treatment in heated (about 50° C.) wash water, followed by rinsing and drying. Pre-cleaning with an alcohol-based cleaner or organic solvent prior to washing may be required to remove adhesives from labels or tapes.

In some cases, it may be necessary to apply a primer to the surface of the substrate before application of the coating composition of the present invention. The primer serves as a barrier coating to prevent interaction of the coating ingredients with the substrate and vice versa, and/or as an adhesive layer to adhere the coating composition to the substrate. Application of the primer may be by any of the methods used in coating technology such as, for example, spray coating, spin coating, spread coating, curtain coating, dip coating, casting or roll-coating.

The use of protective coatings, some of which may contain polymer-forming organosilanes, as primers to improve adhesion of subsequently applied coatings has been described. In particular, the use of non-tintable coatings is preferred. Examples of commercial coating products include SILVUE® 124 and HI-GARDO® coatings, available from SDC Coatings, Inc. and PPG Industries, Inc., respectively. In addition, depending on the intended use of the coated article, it may be necessary to apply an appropriate protective coating(s), i.e., an abrasion resistant coating and/or coatings that serve as oxygen barriers, onto the exposed surface of the coating composition to prevent scratches from the effects of friction and abrasion and interactions of oxygen with the photochromic compounds, respectively. In some cases, the primer and protective coatings are interchangeable, i.e., the same coating may be used as the primer and the protective coating(s). Hardcoats based on inorganic materials such as silica, titania and/or zirconia as well as organic hardcoats of the type that are ultraviolet light curable may be used.

Other coatings or surface treatments, e.g., a tintable coating, antireflective surface, etc., may also be applied to the photochromic coated articles of the present invention. An antireflective coating, e.g., a monolayer or multilayer of metal oxides, metal fluorides, or other such materials, may be deposited onto the photochromic articles, e.g., lenses, of the present invention through vacuum evaporation, sputtering, or some other method.

The coating composition of the present invention may be applied using the same methods described herein for applying the primer and the protective coating(s) or other methods known in the art can be used. For example, the methods used in preparing overlays, such as the method described in U.S. Pat. No. 4,873,029 may be used. Preferably, the coating composition is applied by spin coating, dip coating or spray coating methods, and most preferably, by spin coating methods. Following application of the coating composition to the treated surface of the substrate, the coating is cured as described hereinbefore.

The organic polymeric material that may be a substrate for the coating composition of the present invention will usually be transparent, but may be translucent or even opaque.

Preferably, the polymeric organic material is a solid transparent or optically clear material, e.g., materials suitable for optical applications, such as plano, ophthalmic and contact lenses, windows, automotive transparencies, e.g., windshields, aircraft transparencies, plastic sheeting, polymeric films, etc.

Examples of polymeric organic materials which may be used as a substrate for the photochromic coating composition described herein include: polymers, i.e., homopolymers and copolymers, of the bis(allyl carbonate) monomers, diethylene glycol dimethacrylate monomers, diisopropenyl benzene monomers, ethoxylated bisphenol A dimethacrylate monomers, ethylene glycol bismethacrylate monomers, poly (ethylene glycol) bismethacrylate monomers, ethoxylated phenol bismethacrylate monomers, alkoxylated polyhydric alcohol acrylate monomers, such as ethoxylated trimethylol propane triacrylate monomers, urethane acrylate monomers, such as those described in U.S. Pat. No. 5,373,033, and vinylbenzene monomers, such as those described in U.S. Pat. No. 5,475,074 and styrene; polymers, i.e., homopolymers and copolymers, mono- or polyfunctional, e.g., di- or multi-functional, acrylate and/or methacrylate monomers, poly($C_1$–$C_{12}$ alkyl methacrylates), such as poly(methyl methacrylate), poly(oxyalkylene)dimethacrylate, poly (alkoxylated phenol methacrylates), cellulose acetate, cellulose triacetate, cellulose acetate propionate, cellulose acetate butyrate, poly(vinyl acetate), poly(vinyl alcohol), poly(vinyl chloride), poly(vinylidene chloride), polyurethanes, polythiourethanes, thermoplastic polycarbonates, polyesters, poly(ethylene terephthalate), polystyrene, poly (alpha methylstyrene), copoly(styrene-methyl methacrylate), copoly(styrene-acrylonitrile), polyvinylbutyral and polymers, i.e., homopolymers and copolymers, of diallylidene pentaerythritol, particularly copolymers with polyol (allyl carbonate) monomers, e.g., diethylene glycol bis(allyl carbonate), and acrylate monomers, e.g., ethyl acrylate, butyl acrylate. Further examples of polymeric organic host materials are disclosed in the U.S. Pat. No. 5,753,146, column 8, line 62 to column 10, line 34.

Transparent copolymers and blends of transparent polymers are also suitable as polymeric materials. Preferably, the substrate for the photochromic coating composition is an optically clear polymerized organic material prepared from a thermoplastic polycarbonate resin, such as the carbonate-linked resin derived from bisphenol A and phosgene, which is sold under the trademark, LEXAN; a polyester, such as the material sold under the trademark, MYLAR; a poly(methyl methacrylate), such as the material sold under the trademark, PLEXIGLAS; polymerizates of a polyol(allyl carbonate) monomer, especially diethylene glycol bis(allyl carbonate), which monomer is sold under the trademark CR-39, and polymerizates of copolymers of a polyol (allyl carbonate), e.g., diethylene glycol bis(allyl carbonate), with other copolymerizable monomeric materials, such as copolymers with vinyl acetate, e.g., copolymers of from 80–90 percent diethylene glycol bis(allyl carbonate) and 10–20 percent vinyl acetate, particularly 80–85 percent of the bis(allyl carbonate) and 15–20 percent vinyl acetate, and copolymers with a polyurethane having terminal diacrylate functionality, as described in U.S. Pat. Nos. 4,360,653 and 4,994,208; and copolymers with aliphatic urethanes, the terminal portion of which contain allyl or acrylyl functional groups, as described in U.S. Pat. No. 5,200,483; poly(vinyl acetate), polyvinylbutyral, polyurethane, polythiourethanes, polymers of members of the group consisting of diethylene glycol dimethacrylate monomers, diisopropenyl benzene monomers, ethoxylated bisphenol A dimethacrylate monomers, ethylene glycol bismethacrylate-monomers, poly(ethylene glycol) bismethacrylate monomers, ethoxylated phenol bismethacrylate monomers and ethoxylated trimethylol propane triacrylate monomers; cellulose acetate, cellulose propionate, cellulose butyrate, cellulose acetate butyrate, polystyrene and copolymers of styrene with methyl methacrylate, vinyl acetate and acrylonitrile.

One contemplated embodiment is the use of optically clear polymerizates, i.e., materials suitable for optical applications, such as optical elements, e.g., plano and vision correcting ophthalmic lenses, windows, clear polymeric films, automotive transparencies, e.g., windshields, aircraft transparencies, plastic sheeting, etc. Such optically clear polymerizates may have a refractive index that may range from 1.48 to 1.75, e.g., from 1.495 to 1.66, particularly from 1.5 to 1.6. Specifically contemplated are optical elements made of thermoplastic polycarbonates.

Another contemplated embodiment is the use of a combination of the photochromic organic resin coating composition of the present invention with optical elements to produce photochromic optical articles. Such articles may be prepared by sequentially applying to the optical element a primer, if necessary, the photochromic organic resin composition of the present invention and appropriate protective coating(s), if necessary.

The present invention is more particularly described in the following examples, which are intended as illustrative only, since numerous modifications and variations therein will be apparent to those skilled in the art.

EXAMPLE 1

Part A

The materials listed in Table A below were added in the order listed to a suitable reaction vessel equipped with an agitator, a thermometer, nitrogen inlet and heat/cooling capabilities. After addition of the materials, nitrogen was introduced into the vessel to provide a nitrogen blanket and the agitator was turned on. Heat was applied until the reaction mixture reached a temperature of 250° F. (121° C.). Further heating was discontinued. The resulting exothermic reaction usually caused an increase in the temperature of the reaction mixture to about 280° F. (138° C.). If the temperature continued to rise above 280° F. (138° C.), cooling was applied. After the reaction temperature reached about 220° F. (104° C.), the product was filtered through a 400 mesh filter. The resulting filtrate was cooled and transferred to a suitable container.

TABLE A

| Material | Number of Equivalents |
|---|---|
| PCLD (400 EW)[1] | 0.75 |
| PCLD (200 EW)[2] | 0.10 |
| Trimethylolpropane | 0.15 |
| DESMODUR W[3] | 2.70 |

[1]Polycaprolactone diol having an equivalent weight of about 400.
[2]Polycaprolactone diol having an equivalent weight of about 200.
[3]Dicyclohexylmethane-4,4'-diisocyanate available from Bayer Corporation.

Part B

The materials listed in Charges 1, 2 and 3 were added in the order and the manner described to a container suitable for use with a BRINKMAN PT-3000 homogenizer:

| Material | Weight (grams) |
|---|---|
| Product of Part A | 50.00 |
| Photochromic No. 1[4] | 0.0018 |
| Photochromic No. 2[5] | 0.0045 |
| Photochromic No. 3[6] | 0.0250 |
| Photochromic No. 4[7] | 0.0025 |
| Diethyltoluenediamine | 13.20 |

[4]An indeno-fused naphthopyran that exhibits a blue color when irradiated with ultraviolet light.
[5]A spironaphthoxazine which colors blue when irradiated with ultraviolet light.
[6]A naphtho[1,2-b]pyran that exhibits a yellow color when irradiated with ultraviolet light.
[7]A naphtho[1,2-b]pyran that exhibits a yellow-orange color when irradiated with ultraviolet light.

Charge-1 was added to the container. Charge-2 was added to the container and the contents were mixed until the materials dissolved. Charge-3 was added and the contents were rapidly mixed.

Part C

The product of Part B was heated to 50° C. and poured into a mold measuring 60 to 80 mm in diameter and placed in an oven at 120° C. for 4 hours. Afterwards, a polymerizate having a center thickness of approximately 3 mm was removed from the mold.

EXAMPLE 2

The procedure of Example 1 was followed except that the photochromic materials in Charge 2 of Part B were not included, a reaction injection molding (RIM) machine such as Max Mixer, available from Max Machines, was used in place of the Brinkman PT-3000 homogenizer. The product of Part B was poured into a mold measuring 60–80 mm that was coated with an external mold release agent and preheated to 150° C. After filling the mold, it was placed in an oven at 150° C. for 16 hours. Afterwards, the lenses, which had a center thickness (CT) of about 2 mm were removed and edged round with an industrial safety bevel to 55 mm. This was done according to the procedures specified within Section 14 of ANSI Z87.1-Draft (Sep. 9, 1999); "Practice for Occupational and Educational Eye and Face Protection".

EXAMPLE 3

Test samples measuring 5 centimeters (cm) by 5 cm by 1.5 millimeters (mm) of Simula 2003, a non-elastomeric poly (urea-urethane) obtained from Simula, Inc. were used.

Comparative Example 1

Test samples measuring 76 mm in diameter and having a thickness of 2 mm cast from an optical resin sold by PPG Industries, Inc. under the designation CR-307 were used.

EXAMPLE 4

Part A

The product of Example 1 was exposed to ultraviolet radiation from a Spectroline Black Light about 5 inches above the polymerizate and tested for percent transmission and a* and b* values. The a* and b* color values of the CIELAB color space were collected under the conditions of a $D_{65}$ illuminant and a 10 degree observer on a Hunter Ultrascan XE color spectrophotometer. See, ASTM E-308-

90 Standard Test Methods for Computing the Colors of Objects by Using the CIE System. The control of the test conditions and acquisition of data was handled by the Labtech Notebook Pro software and the recommended I/O board. Percent transmission was also determined using the Hunter Ultrascan XE color spectrophotometer. Results are listed in Table 1.

TABLE 1

| Polymerizate of Example 1 | Percent Transmission | a* value | b* value |
| --- | --- | --- | --- |
| Before UV Activation | 61.2 | −2.94 | 8.10 |
| After UV Activation | 44.4 | 0.13 | 14.3 |

The results of Table 1 show that the photochromic compounds in the polymerizate of Example 1 became activated after exposure to ultraviolet radiation. Activation of the photochromics caused a reduction in the percent transmission and a change in the a* and b* values as compared to the polymerizate before activation with ultraviolet light.

Part B

The product of Example 2 was tested by ICS Inc. Laboratories according to the procedures of ANSI Z87.1-Draft (Sep. 9, 1999); "Practice for Occupational and Educational Eye and Face Protectionz" for the Non-Plano Spectacle Lens—High Impact Requirements of Paragraph (Par.) 7.5.2.1—High Mass Impact; Par. 7.5.2.2—High Velocity Impact; and Par. 7.5.2.3 Penetration. Five lenses were tested in each of the three tests. The results are listed in Table 2.

TABLE 2

| Lenses of Example 2 (2 mm CT) Tested according to: | Result |
| --- | --- |
| Par. 7.5.2.1: High Mass Impact | Pass |
| par. 7.5.2.2: High Velocity Impact | Pass |
| Par. 7.5.2.3: Penetration Test | Pass |

The results of Table 2 show that the lenses of Example 2 having a center thickness of about 2 mm, passed the Non-Plano Spectacle Lens High Impact Requirement of High Mass Impact, High Velocity Impact and Penetration of ANSI Z87.1-Draft (Sep. 9, 1999) Section 7 on Spectacles.

Part C

The impact resistance of two lenses was measured using an AO impactor from American Optical Corporation. The lenses were prepared following the procedures of Example 2 except that the CT of the lenses was about 1 mm and the lenses were not edged round. The lenses were designated Example 2A and 2B in Table 3. The AO impactor is equipped with an anvil for supporting a test specimen, a ⅝" bullet supported vertically above the anvil at a fixed distance from it, and compressed air to propel the bullet from the support at velocities in excess of free fall onto the test specimen on the anvil. The total energy applied to the test specimen was calculated from the velocities of the bullet measured by a frequency counter, and the weight of the bullet. The impact energy is expressed as ft-lbs. Results are listed in Table 3.

TABLE 3

| Example # | Impact Velocity (ft/sec) | Impact Energy (Ft-lb) | Equivalent Ball Drop Height (in.) |
| --- | --- | --- | --- |
| 2A (1 mm CT) | 90.62 | 4.578 | 1530 |
| 2B (1 mm CT) | 98.78 | 5.439 | 1818 |

The results of Table 3 show that the lenses of Example 2, prepared according to the procedure of Part C of Example 3 (having a CT of about 1 mm) were at least 30 times more impact resistant than specified by the Food and Drug Administration (FDA) in CFR 801.410. The increase in impact resistance of at least 30 fold was based on the impact energy of the lens of Example 2A divided by the minimal impact energy specified by the FDA, i.e., 4.578/0.15 which equals 30.52. The impact resistance of the Example 2B lens was approximately 36 times more impact resistant than specified by the FDA.

Part D

The test samples of Example 3 and Comparative Example 1 were evaluated in a photochromic imbibition test to determine what conditions, e.g., time and temperature, would be necessary to imbibe comparable amounts of photochromic compounds. The amounts of photochromic compound imbibed was determined by measuring the absorbance of the test sample after imbibition at 390 nanometers in a UV spectrophotometer.

A photochromic imbibition composition of the type described in U.S. Pat. No. 5,770,115 was used. The photochromic imbibition composition was applied to the surface of the test samples by spincoating. The average wet weight of the imbibition resin film was approximately 0.2 milligrams per test sample. The applied film was dried under an infrared lamp for approximately 20 minutes, unless indicated otherwise. The imbibition resin coated samples were placed in an oven at the temperatures indicated and for the times listed in Table 4. Table 4 also includes the absorbance ⓐ 390 nm indicating the amount of the photochromic compounds imbibed.

TABLE 4

| Example # | Time (hours) | Temperature (° C.) | UV Absorbance @ 390 nm |
| --- | --- | --- | --- |
| 3 | 6.5 | 135 | 3.9 |
| 3 | 2.0 | 135 | 3.4 |
| 3 | 1.7 | 135 | 4.5 |
| 3 | 1.0 | 135 | 3.0 |
| 3 | 1.0 | 120 | 3.4 |
| 3* | 0.7 | 100 | 2.2 |
| CE 1 | 5.0 | 135 | 2.4 |

*The imbibition resin coated samples were placed directly in the oven.

The results of Table 4 show that the test samples of Example 3 were imbibed with a comparable amount of photochromic compounds at a lower temperature and in shorter time period than the test samples of Comparative Example 1.

Although the present invention has been described with reference to specific details of particular embodiments thereof. It is not intended that such details be regarded as limitations upon the scope of the invention except insofar as to the extent that they are included in the accompanying claims.

We claim:

1. An organic resin composition comprising:

(a) the reaction product of:
(i) at least one polyol having greater than 1.0 hydroxyl groups per molecule;
(ii) at least one polyisocyanate having greater than 1.0 isocyanato groups per molecule; and
(iii) at least one aromatic polyamine having greater than 1.0 amino groups per molecule; wherein the number of isocyanato groups of the polyisocyanate reactants is greater than the number of hydroxyl groups of the polyol reactants; and (b) a photochromic amount of organic photochromic compound(s).

2. The organic resin of claim 1 wherein component (a) of the composition further comprises at least one polyol having greater than 2.0 hydroxyl groups per molecule, wherein the polyol having greater than 2.0 hydroxyl groups is different from the polyol having greater than 1.0 hydroxyl groups.

3. The organic resin of claim 1, wherein component (a) is the reaction product of:

(a) a polyurethane prepolymer comprising the reaction product of:
(i) at least one polyol having greater than 1.0 hydroxyl groups per molecule; and
(ii) at least one polyisocyanate having greater than 1.0 isocyanato groups per molecule; and (b) at least one aromatic polyamine having greater than 1.0 amino groups per molecule, wherein the number of isocyanato groups of the polyisocyanate reactants is greater than the number of hydroxyl groups of the polyol reactants.

4. The organic resin of claim 3 wherein component (a) further comprises at least one polyol having greater than 2.0 hydroxyl groups per molecule, wherein the polyol having greater than 2.0 hydroxyl groups is different from the polyol having greater than 1.0 hydroxyl groups.

5. The organic resin of claim 1 wherein the polyol having greater than 1.0 hydroxyl groups is selected from aliphatic, alicyclic, aromatic, alipatic-alicyclic, aliphatic-aromatic, alicyclic-aromatic or aliphatic-alicyclic-aromatic polyols.

6. The organic resin of claim 5 wherein the polyol is selected from diols having a molecular weight of less than 500 grams per mole; or ester diols, polyester diols, polyether diols or mixtures thereof that are different from the diols having a molecular weight of less than 500 grams per mole.

7. The organic resin of claim 6 wherein the polyester diol is poly (caprolactone diol).

8. The organic resin of claim 1 wherein the polyisocyante is selected from aliphatic isocyanantes, alicyclic isocyanates, aromatic isocyanates, or mixtures thereof.

9. The organic resion of claim 8 wherein the polyisocyanate is bis(4-isocyanatocyclohexyl)methane.

10. The organic resin of claim 1 wherein the polyamine is selected from:

(a) $C_1$–$C_3$ dialkyl toluenediamine;
(b) diamines respresented by the following formula:

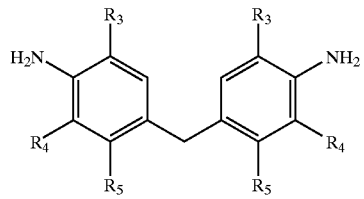

wherein $R_3$ and $R_4$ are each independently $C_1$–$C_3$ alkyl, and $R_5$ is selected from hydrogen or halogen; or
(c) mixtures thereof.

11. The organic resin of claim 10 wherein the polyamine is selected from: 3,5-diethyl-2,4-toluenediamine, 3,5-diethyl-2,6-toluenediamine or mixtures thereof.

12. The organic resin of claim 2 wherein the polyol having greater than 2.0 hydroxyl groups is selected from glycerol, 1,1,1-trimethylolethane, 1,1,1-trimethylolpropane, 1,2,3-benzenetriol, 1,2,4-benzenetriol, 1,3,5-benzenetriol, 1,3,5-cyclohexanetriol, erythritol, pentaerythritol, 4,4'-(1,2-diethyl-1,2-dihydroxyethanediyl)bis[phenol], sorbitol, mannitol, α-methylglucoside, sorbitan, dipentaerythritol, tripentaerythritol or mixtures thereof.

13. The organic resin of claim 1 wherein the organic photochromic compound(s) is selected from the group consisting of naphthopyrans, benzopyrans, phenanthropyrans, indenonaphthopyrans, spiro(benzindoline)naphthopyrans, spiro(indoline)benzopyrans, spiro(indoline)naphthopyrans, spiro(indoline)quinopyrans, spiro(indoline)pyrans, spiro(indoline)naphthoxazines, spiro(indoline)pyridobenzoxazines, spiro(benzindoline)pyridobenzoxazines, spiro(benzindoline)naphthoxazines, spiro(indoline)benzoxazines, mercury dithizonates, fulgides, fulgimides and mixtures thereof.

14. The organic resin of claim 1 further comprising from 0.01 to 10.0 weight percent, based on the total weight of the organic resin composition, of hindered amine light stabilizer materials.

15. The organic resin of claim 14 wherein the hindered amine light stabilizer material is selected from bis(1,2,2,6,6-pentamethyl-4-piperdinyl)[3,5-bis(1,1-dimethylethyl-4-hydroxyphenyl)methyl]butyl propanedioate; bis(1,2,2,6,6-pentamethyl-4-piperdinyl)sebacate and methyl(1,2,2,6,6-pentamethyl-4-piperidinyl sebacate; N-unsubstituted HALS materials; or mixtures thereof.

16. The polymerizate of the organic resin composition of claim 1.

17. The polymerizate of the organic resin composition of claim 3.

18. The polymerizate of the organic resin composition of claim 12.

19. The polymerizate of the organic resin composition of claim 15.

20. An article comprising, in combination, a substrate and a photochromic poly(urea-urethane) coating on at least one surface of said substrate, said photochromic poly(urea-urethane) coating being prepared from an organic resin composition comprising:

(a) the reaction product of:
(i) at least one polyol having greater than 1.0 hydroxyl groups per molecule;
(ii) at least one polyisocyanate having greater than 1.0 isocyanato groups per molecule; and
(iii) at least one aromatic polyamine having greater than 1.0 amino groups per molecule; wherein the number of isocyanato groups of the polyisocyanate reactants is greater than the number of hydroxyl groups of the polyol reactants; and (b) a photochromic amount of organic photochromic compound(s).

21. The article of claim 20 wherein component (a) of the composition further comprises at least one polyol having greater than 2.0 hydroxyl groups per molecule, wherein the polyol having greater than 2.0 hydroxyl groups is different from the polyol having greater than 1.0 hydroxyl groups.

22. The article of claim 20, wherein component (a) of the composition is the reaction product of:

(a) a polyurethane prepolymer comprising the reaction product of:
  (i) at least one polyol having greater than 1.0 hydroxyl groups permolecule; and
  (ii) at least one polyisocyanate having greater than 1.0 isocyanato groups per molecule; and (b) at least one aromatic polyamine having greater than 1.0 amino groups per molecule, wherein the number of isocyanato groups of the polyisocyanate reactants is greater than the number of hydroxyl groups of the polyol reactants.

23. The article of claim 22, wherein component (a) of the composition further comprises at least one polyol having greater than 2.0 hydroxyl groups per molecule, wherein the polyol having greater than 2.0 hydroxyl groups is different from the polyol having greater than 1.0 hydroxyl groups.

24. The article of claim 20 wherein the organic resin composition further comprises from 0.01 to 10.0 weight percent, based on the total weight of the organic resin composition, of hindered amine light stabilizer materials.

25. The article of claim 20 wherein said substrate is selected from the group consisting of paper, glass, ceramic, wood, masonry, textile, metal and organic polymeric materials.

26. The article of claim 25 wherein said organic polymeric material is selected from the group consisting of poly ($C_1$–$C_{12}$ alkyl methacrylates), poly(oxyalkylene dimethacrylates), poly(alkoxylated phenol methacrylates), cellulose acetate, cellulose triacetate, cellulose acetate propionate, cellulose acetate butyrate, poly(vinyl acetate), poly(vinyl alcohol), poly(vinyl chloride), poly(vinylidene chloride), thermoplastic polycarbonates, polyesters, polyurethanes, polythiourethanes, poly(ethylene terephthalate), polystyrene, poly(alpha methylstyrene), copoly(styrene-methylmethacrylate), copoly(styrene-acrylonitrile), polyvinylbutyral and polymers of bis(allyl carbonate) monomers, polyfunctional acrylate monomers, polyfunctional methacrylate monomers, diethylene glycol dimethacrylate monomers, diisopropenyl benzene monomers, ethoxylated bisphenol A dimethacrylate monomers, ethylene glycol bismethacrylate monomers, poly(ethylene glycol) bismethacrylate monomers, ethoxylated phenol bis methacrylate monomers, alkoxylated polyhydric alcohol polyacrylate monomers, styrene monomers, urethane acrylate monomers, glycidyl acrylate monomers, glycidyl methacrylate monomers, and diallylidene pentaerythritol monomers.

27. The article of claim 26 wherein the organic polymeric material is a solid transparent polymer selected from the group consisting of poly(methyl methacrylate), poly(ethylene glycol bismethacrylate), poly(ethoxylated bisphenol A dimethacrylate), thermoplastic polycarbonate, poly(vinyl acetate), polyvinylbutyral, polyurethane, polythiourethane and polymers of diethylene glycol bis(allyl carbonate) monomers, diethylene glycol dimethacrylate monomers, ethoxylated phenol bis methacrylate monomers, diisopropenyl benzene monomers and ethoxylated trimethylol propane triacrylate monomers.

28. The article of claim 27 wherein said substrate is an optical element.

29. The article of claim 28 wherein said optical element is a lens.

* * * * *